Oct. 16, 1962     W. D. FREDERICK     3,058,639
TICKET ISSUING DEVICE FOR PARKING METERS
Filed Oct. 20, 1960     3 Sheets-Sheet 2

W. D. FREDERICK
INVENTOR

BY C.A. Snow & Co.
ATTORNEYS

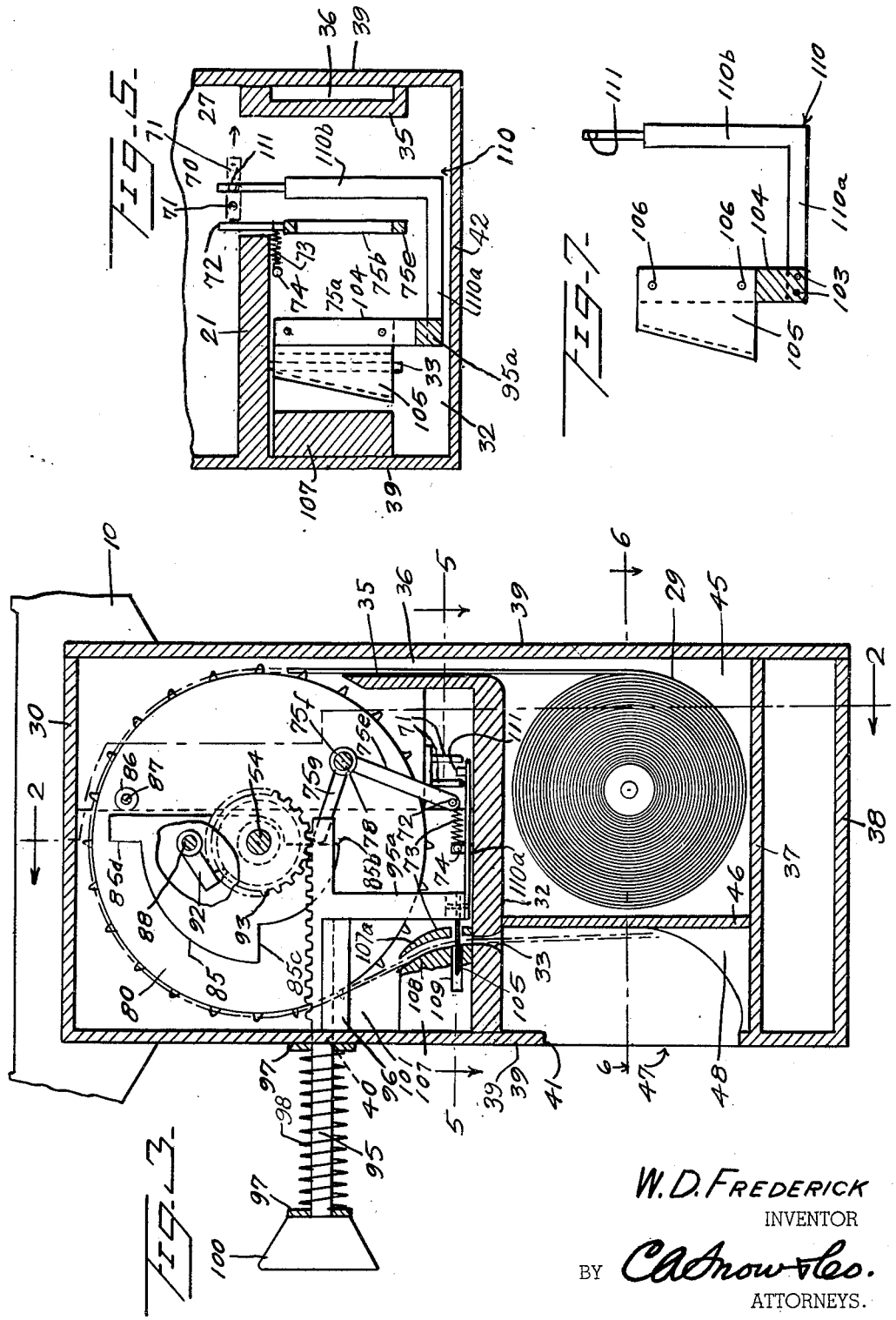

United States Patent Office 3,058,639
Patented Oct. 16, 1962

3,058,639
TICKET ISSUING DEVICE FOR PARKING
METERS
Willard D. Frederick, P.O. Box 1395, Winter Haven, Fla.
Filed Oct. 20, 1960, Ser. No. 63,835
11 Claims. (Cl. 226—76)

This invention concerns a ticket issuing device for use in conjuction with parking meters.

At the present time many automobile drivers park their automobiles in private parking lots and then shop in nearby stores. It is the usual practice for the proprietors of the parking lot to issue a ticket to the automobile driver showing the time at which the latter parked his automobile on the parking lot. In order to encourage automobile drivers to trade in their places of business, merchants frequently have an arrangement with a nearby parking lot whereby the merchant will pay for a fraction of an hour's, an hour's or a multiple of an hour's parking time. The automobile driver shows his parking ticket to the merchant as evidence that he has parked his automobile on the parking lot and receives credit on the amount of his purchase for whatever amount the merchant has agreed with the proprietor of the parking lot to pay. Then upon returning to get his automobile, the driver will pay for the parking service upon an hourly basis, subject usually to a minimum charge.

The above is a satisfactory arrangement as far as the automobile drivers who park their automobiles on private parking lots are concerned. However, there are some automobile drivers who prefer to park their automobiles on the streets, and even some of those who may prefer to park them on parking lots may not be able to find available space. Street parking is usually regulated by parking meters. In the latter case the automobile driver has at the present time, no way of getting any credit on his purchase for the amount he has expended for parking and the merchants have no way of encouraging the patronage of those automobile drivers, since the latter have no receipts to present showing the amounts that they have expended for parking.

An object of the present invention is to provide a ticket issuing device for use with parking meters.

Another object of the present invention is to provide a ticket issuing device for parking meters, which will issue ticket receipts for the amount paid for parking and thus provide the merchants in the downtown areas which are known as the "core areas," of the larger cities with equal advantage in the matter of reimbursing customers for parking charges to that enjoyed by the merchants in the shopping centers.

A further object of the present invention is to provide a ticket issuing device for use with parking meters, which device the automobile driver may operate at the same time that the operating knob or handle of the parking meter is rotated, to wind the clock works mechanism and set the indicator of the parking meter, for issuing a ticket as a receipt for the parking charge paid.

An additional object of the present invention is to provide a ticket issuing device for use in association with parking meters which will issue ticket receipts in proportion to the denomination of the coin inserted in the meter.

Still another object of the persent invention is to provide a ticket issuing device for use in association with parking meters, which will present a ticket to the person operating the parking meter, but which will, if the ticket should not be accepted within a few minutes, withdraw same. This will mean a saving to merchants through not having to redeem tickets, except for persons actually making use of the parking facilities provided. If the ticket should not be desired by the person parking the automobile, it will not be available in the ticket issuing device or lying on the ground near the parking meter, to be picked up by some person passing by and later presented for redemption.

A still further object of the present invention is to provide a ticket issuing device for use in conjunction with parking meters, which will present an inducement to the person parking the automobile, if in doubt as to the amount of parking time required, to purchase more than the estimated minimum amount. The fact that every parking ticket purchased will in time be redeemed, which makes his parking cost nothing, will induce him to consider the wisdom of buying at least an ample amount of parking time, rather than risk a police department ticket for overtime parking.

It is still another object of the present invention to provide a ticket issuing device for use in association with parking meters which will tend to increase the percentage of occupancy of parking lots through the above mentioned inducement to the automobile drivers to buy ample parking time. This will result in greater revenues from the parking lots, which will in turn make a more simple matter of retiring the existing revenue cerificates of indebtedness on parking lots and facilitate the sale of revenue certificates for additional parking lots.

It is a still further object of the present invention to provide a ticket issuing device for use in conjunction with parking meters, which will increase the sales of parking meters. As above noted, the present invention will practically provide free parking. This will result in automobile drivers parking for longer periods of time and more people using the parking facilities. It then follows that there will be a higher percentage of occupancy of the parking lots and more parking lots will be required and hence more parking meters.

It is also an object of the present invention to provide a ticket issuing device for use in conjunction with parking meters, which device can be used on almost all existing parking meters, without any material modification of the latter.

Still other objects, advantages and improvements will become apparent from the following specification, taken in connection with the accompanying drawings, in which:

FIG. 3 is a sectional view, taken on the section line 3—3 of FIG. 2 and looking in the direction of the arrows showing the ticket roll and the operating rod for actuating the ticket dispensing mechanism.

FIG. 4 is a vertical sectional view, taken on the section line 4—4 of FIG. 2, and looking in the direction of the arrows, and showing the driving connection of the ticket issuing device according to the present invention from the arbor shaft of the clock works mechanism.

FIG. 4-A is a detail sectional view showing the dual resetting mechanism for the timer ratchet pawl release lever.

Figure 2:
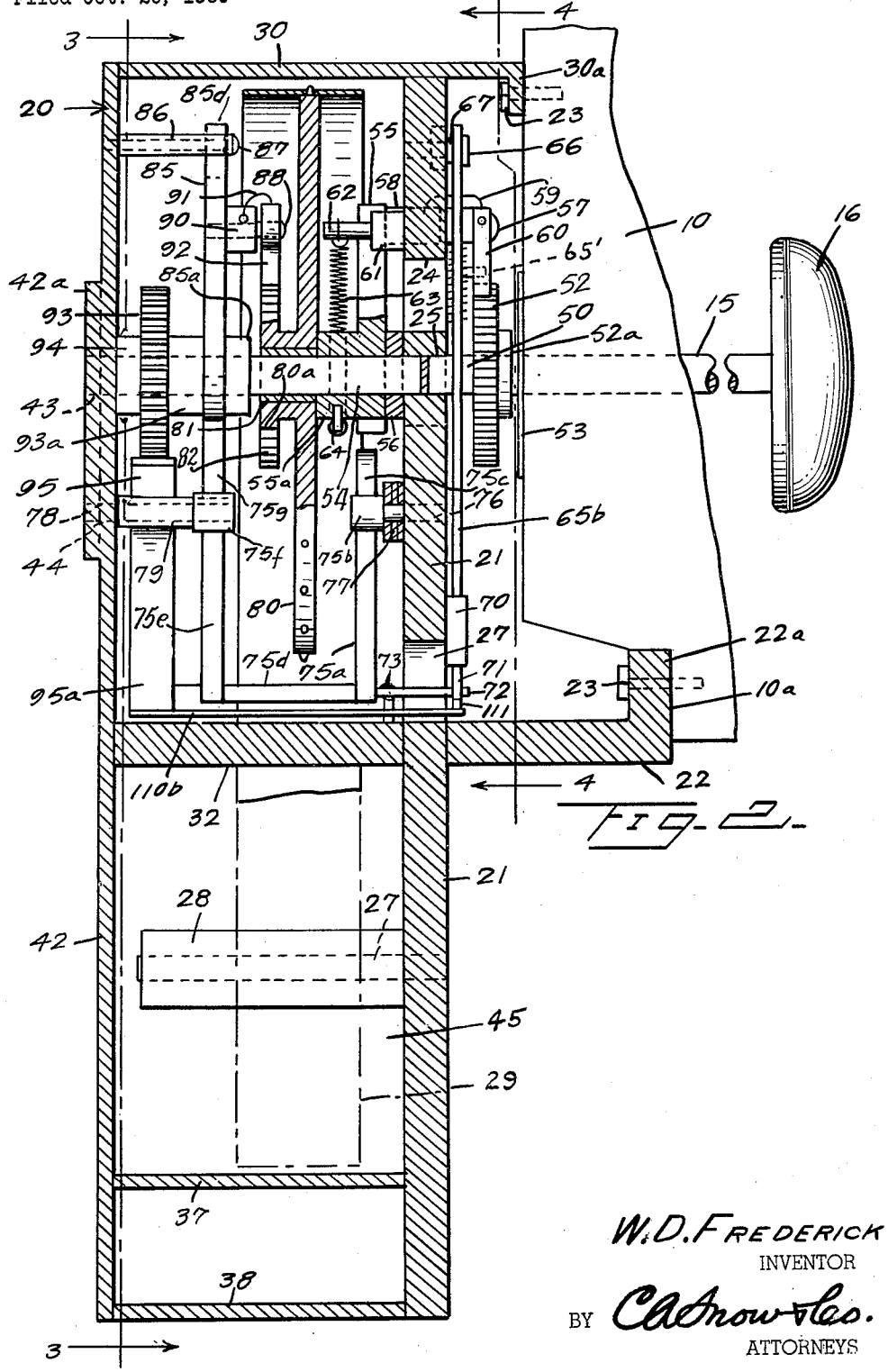
FIG. 2 is a sectional view, taken on the section line 2—2 of FIG. 3 and looking in the direction of the arrows, showing the interior of the ticket issuing device according to the present invention, and the relative arrangement of the timer and the ticket issuing mechanism.

FIG. 5 is a sectional view, taken on the section line 5—5 of FIG. 2 and looking in the direction of the arrows, showing the ticket severing knife and the timer ratchet pawl resetting mechanism.

Figure 1:
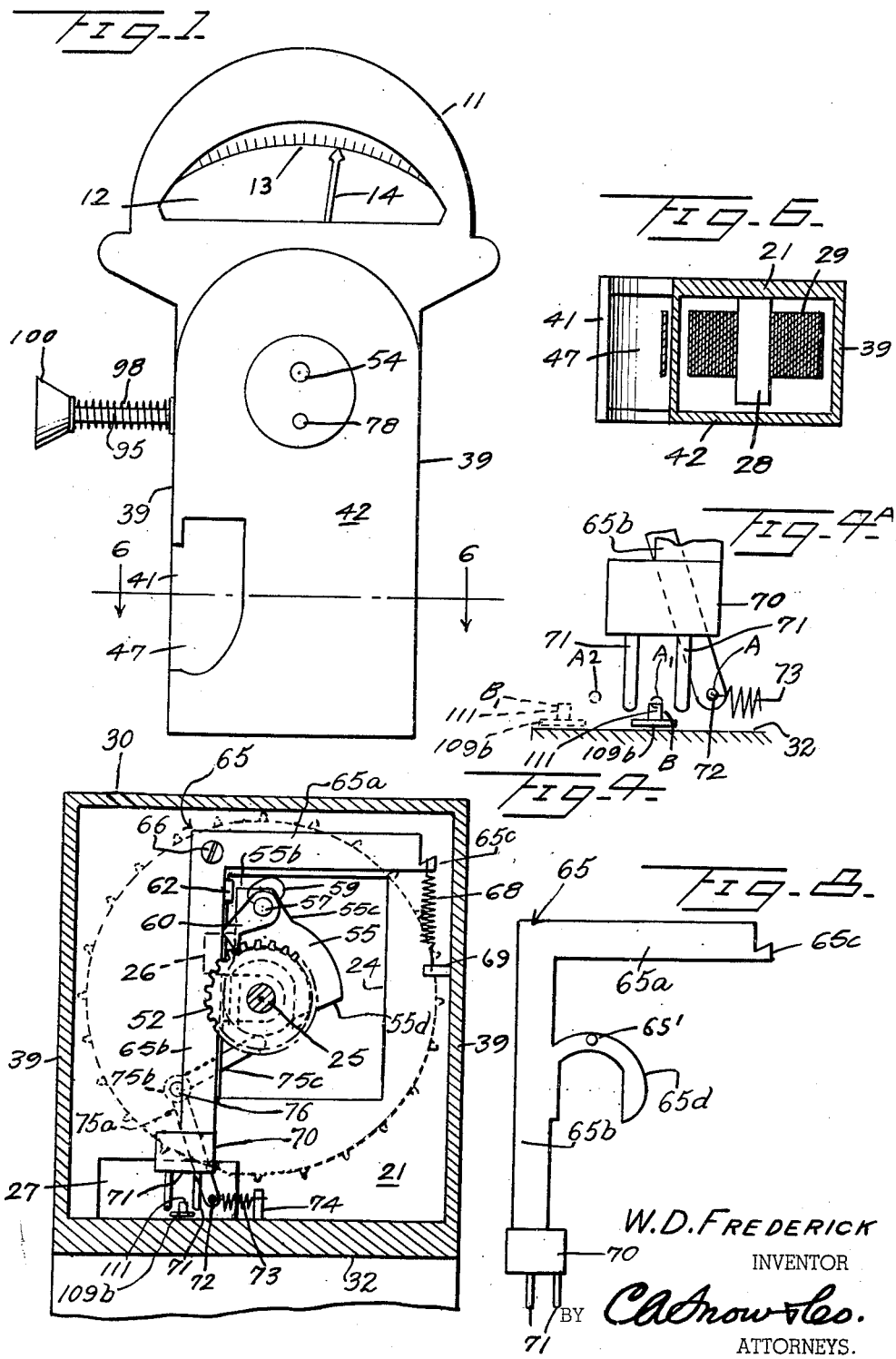
FIGURE 1 is a rear elevational view of a parking meter with the ticket issuing device according to the present invention attached to same.

FIG. 6 is a horizontal sectional view, taken on the section lines 6—6 of FIGS. 1 and 3, and looking in the direction of the arrows, and showing the ticket storage roll.

FIG. 7 is a detail top plan view, showing the reciprocating knife for severing a ticket from the strip of tickets.

FIG. 8 is a detail side elevational view showing the timer ratchet release lever.

The ticket issuing device according to the present invention is particularly adapted for use with a parking meter of the type described and illustrated in U.S. Patent No. 2,070,445 to S. L. Miller et al., issued on February 9, 1937. In the parking meter according to that patent, manipulation of the operating lever or handle winds a clock works mechanism, sets an indicating pointer to a position on a scale showing the amount of parking time paid for, and drops the coin previously inserted, from a position at the rear of a window through which it could be viewed, into a coin receptacle. Such parking meters are made to run for varying lengths of time for coins of different denominations deposited. For instance, in one well known parking meter, a penny can be inserted for twelve (12) minutes of parking time, a nickel for an hour, and a dime for two (2) hours.

In the parking meter according to the above referred to patent to Miller et al., as well as several other well known parking meters, the clock works mechanism is enclosed in a casing at 10, which latter has an inset portion at 10a. At the front of the casing, the latter has a curved top 11, which mounts a window 12, as shown in FIG. 1. Inside of the window 12 there is a scale 13 over which an indicator hand 14 moves in the counter-clockwise direction to show the amount of parking time still to be used.

The clock works mechanism within the casing 10 has a central arbor or main spring shaft 15, which is rotated in one direction by the operating knob 16 to wind up the main spring, while at the same time rotating the indicator hand 14 in the clockwise direction to show the amount of parking time paid for, and releasing the previously inserted coin from a position to the rear of the viewing window (not shown), to allow same to fall into a coin collection receptacle (also not shown). Conversely, the shaft 15 is rotated in the opposite direction as the clock works mechanism runs down and the parking time expires, with the indicator hand 14 returning to zero. It will be understood that the parking meter is provided with a conventional full stroke mechanism (not shown), so that rotation of the arbor shaft 15 by the knob 16 can be only in one direction.

The ticket issuing device according to the present invention is enclosed by a casing which is generally designated by the reference numeral 20. The casing is comprised by a fixed front plate 21, a top horizontal plate 30, an intermediate horizontal plate 32, a lower horizontal plate 37, a bottom horizontal plate 38, side plates 39—39 and a removable rear plate 42, all secured together in any suitable manner (not shown). The top horizontal plate 30 extends forwardly, beyond the front plate 21, and at its front end has an inturned flange 30a. Bolts or machine screws 23 pass through suitable holes in this flange 29a and are received in aligned holes in the casing 10 of the parking meter, to form part of the attachment of the casing 20 of the ticket issuing device onto the latter. Also, an angle bracket 22 is provided for further securing the casing 20 of the ticket issuing device to the casing 10 of the parking meter. This angle bracket 22 is secured to the front plate 21 in approximate alignment with the intermediate horizontal plate 32, but on the opposite side of the front plate from the latter, as by welding. At its front end the angle bracket 22 also has an inturned right angle flange 22a and bolts or machine screws 23 likewise pass through suitable holes in this flange and are received in suitable aligned holes in the inset portion 10a of the casing of the parking meter.

An additional plate 46 is positioned parallel to the side plates 39—39 and between the intermediate horizontal plate 32 and the lower horizontal plate 37, thus dividing the space between these latter plates into a ticket roll compartment 45 and a ticket delivery compartment 47. It will thus be seen that the lower horizontal plate 37 forms a bottom for both the ticket roll compartment 45 and the ticket delivery compartment 47 The bottom horizontal plate 38 may be provided, if desired, to close the bottom of the casing 20.

Within the ticket roll compartment 45 a roll of tickets 29 wound on a spool 28 is rotatably mounted on an axle 27, which latter is secured in a suitable hole in the front plate 21. It is contemplated that the strip of tickets will have uniformly spaced rows of perforations transversely thereof, a ticket between two adjacent rows of perforations corresponding to a payment of five cents (5¢) and two (2) tickets between alternate rows of perforations corresponding to a payment of ten cents (10¢). At one end the intermediate horizontal plate 32 is formed with an upwardly extending right angle flange 35, which is closely spaced with respect to the adjacent side wall 39, and which has therein a channel 36 rectangular in cross section. The tickets leaving the ticket roll 29 pass through this channel 36, and over the ticket sprocket 80, to be later described. Tickets that have thus passed over the ticket sprocket 80 and have been severed by a knife 105, also to be later described, fall through an aperture 33 in the intermediate horizontal plate 32 and into the ticket delivery compartment 47. One of the side plates 39 is formed with an opening 41, through which the person operating the parking meter may insert a finger to remove a ticket from the ticket delivery compartment 47. A filler block 48, which is suitably curved on the top, may be placed in the bottom of the ticket delivery compartment 47 to facilitate the removal of the tickets.

The ticket dispensing mechanism according to the present invention is operated from the central arbor or main spring shaft 15 of the clock works mechanism in the parking meter by a short stub shaft 50, which is the timer ratchet shaft. This shaft extends at one end through a suitable hole in the rear wall of the casing 10 of the clock works mechanism and is drivably connected to the arbor or main spring shaft 15 of the latter in any suitable manner (not shown). At its other end the stub shaft 50 is journaled in a suitable hole 25 in a lug 26, which extends inwardly from the side wall of an upper rectangular aperture 24 in the front plate 21. A timer rachet gear 52, having a hub 52a, is secured to the time shaft 50 for rotation with the latter and is positioned intermediate the rear wall of the casing 10 and the front plate 21. Around the timer ratchet shaft 50 and between the hub 52a of the timer ratchet gear 52, and the rear wall of the casing 10 there is placed a washer 53 of leather or other pliable material.

A ticket sprocket shaft 54 is mounted within the casing 20 and is concentrically positioned with respect to the timer ratchet shaft 50, and is journalled at one end in the same hole 25 in the front plate 21 as the stub shaft 50, and at its other end in a hole 43 in the rear plate 42. This rear plate 42 has a boss 42a thereon to provide additional bearing surface for the ticket sprocket shaft 54 and for a timer cam follower 75 to be later described. On the ticket sprocket shaft 54 there is freely mounted a timer cam 55, which has a hub 55a and radially projecting lug 55b and two cam lobes 55c and 55d, respectively, thereon. The timer cam 55 is spaced from the front plate 21 by a collar 56, which freely surrounds the ticket sprocket shaft 54 and abuts the timer cam on one face and the plate 21 on its other face. A pin 57 is mounted in a suitable hole through the lug 55b and at its inner end this pin carries a pivotally mounted timer pawl 60, which engages with the timer ratchet gear 52. The timer pawl 60 is positioned in alignment with the timer ratchet gear 52 by a spacer sleeve 58, which surrounds the pin 57. Also, the timer pawl 60 is biased into engagement with the timer ratchet gear 52 by a bow spring 59, which at one end is mounted in a suitable hole in the spacer sleeve 58 and at the other end bears on the timer pawl. As previously stated, the inner plate 21 has therein an upper rectangular aperture 24, which allows for partial rotation, through 180°, of the pin 57 and the spacer sleeve 58, along with the timer cam 55. A stop block 61 is mounted along one side of the upper aperture 24 in the front plate 21 and at the outer end this stop block carries a pin 62. The radially positioned lug 55b on the timer cam 55 abuts this stop block 61 and the latter limits counter-clockwise rotation (FIG. 4) of the timer cam to the normal rest position. A coiled tension spring 63 is provided for biasing the timer cam 55 to its rest position and this spring partially encircles the hub 55a of the timer cam, is secured at one end to a radially positioned pin 64 in the latter, and at its other end is attached to the pin 62.

A timer ratchet pawl release is comprised by an inverted L-shaped lever 65, which has a horizontal arm 65a and a vertical arm 65b. This lever 65 is pivotally mounted by a screw 66, which passes through a suitable hole in the corner of the lever and is received in an aligned screw threaded hole in the front plate 21. The lever is spaced outwardly from the front plate 21 to provide clearance by a washer 67, which surrounds the screw 61 and is positioned between the lever and the front plate. At the other end of the horizontal arm 65a, a coiled tension spring 68 is secured at one end to the hook 65c and at its other end to a pin 69 in the adjacent side plate 39. Along the vertical arm 65b of the lever and at approximately the mid-height of the latter there is formed an integral and inwardly extending inverted U-shaped cam extension 65d, which partially surrounds the timer ratchet shaft 50. This extension 65d has a pin 68' thereon, which is positioned beneath the timer ratchet pawl 60 and, when the lever is partially rotated in the counterclockwise direction (FIG. 4), the extension will lift the timer ratchet pawl 60 from engagement with the timer ratchet gear 52, and allow the latter to be returned by the coiled tension spring 63 to the normal or rest position, with its radially projecting lug 55b against the stop block 61. At the lower end of the vertical arm 65b of the timer ratchet pawl release lever 68 there is secured a block 70, which has in its bottom a pair of parallel pins 71—71. This block 70 oscillates as the lever 65 is swung past a lower rectangular aperture 27 in the inner plate 21, which aperture is positioned just above the intermediate horizontal plate 32.

A U-shaped timer cam follower, which is designated generally by the reference numeral 75 is swingably mounted between the inner plate 21 and the outer plate 42. This timer cam follower is comprised by a lower rod 75d, a right integral fore arm 75a (FIG. 2), a right integral boss 75b, a right integral follower arm 75c, at approximately a right angle to the fore arm 75a, a left integral fore arm 75e, a left integral boss 75f, and a left integral stop arm 75g, at approximately a right angle to the fore arm 75e. A pivotal mounting for the timer cam follower 75 is comprised by a pair of pins 76 and 78; the pin 76 is secured in the inner plate 21 and is mounted in the right boss 75b; the pin 78 is received in the rear plate 42 and is received in the left boss 75f. Spacer washers 77 surround the pin 76 and are positioned between the right boss 75b and the front plate 21; similarly, a spacer sleeve 79 surrounds the pin 78 and is positioned between the left boss 75f and the rear plate 42. The right follower arm 75c is positioned in the path of and cooperates with the timer cam 55. Likewise, the left stop arm 75g is positioned in the path of and cooperates with the ticket cam 85, to be later described.

The timer cam follower 75 operates the timer ratchet pawl 60 to reset the latter through a short flexible rod 72, which is positioned in a suitable hole in the right fore arm 75a, co-axial with respect to the lower rod 75d, and extends through the lower rectangular aperture 27 in the front plate 21 and into the path of movement of the pins 71 (FIG. 4) on the block 70 at the lower end of the vertical arm 65a of the timer ratchet pawl release lever 65. A coiled tension spring 73 is connected at one end to the pin 72 on the timer cam follower 75 and at the other end to a pin 74 on the intermediate horizontal plate 32. This spring serves to bias the right follower arm 75c on the timer cam follower into engagement with the timer cam 55 and the left stop arm 75g into engagement with the ticket cam 85.

The ticket sprocket 80 is freely mounted on the ticket sprocket shaft 54 by a bushing 81 and abuts on one face the hub 55a of the timer cam 55. This sprocket has a hub 80a on which a ticket ratchet gear 82 is integrally formed.

As previously stated and shown in FIG. 3, the strip of tickets from the ticket roll 29 in the ticket compartment 45 is trained upwardly through the channel 36, partially formed in the vertically positioned flange 35 on the intermediate horizontal plate 32 and bounded by one of the side walls 39, and over the ticket sprocket 80. From the ticket sprocket 80 the strip of tickets is trained downwardly, past a knife 105, to be later described, through the aperture 33 in the intermediate horizontal plate 32, and into the ticket delivery compartment 47.

The ticket cam 85 is also freely mounted on the ticket sprocket shaft 54 and has an integral hub 85a on its inner face, which is closely spaced with respect to the hub 80a of the ticket sprocket. This cam also has thereon a radially extending lug 85d and two lobes 85c and 85b, spaced respectively 90° and 180° from the lug 85d, which lobes are, as previously stated, adapted to selectively abut the left stop arm 75g on the timer cam follower 75. A stop is comprised by a sleeve 86 surrounding a machine screw 87, which is mounted in the outer plate 42, and the radially extending lug 85d abuts this stop, when the cam is in its normal or rest position. Along the center line of the radially positioned lug 85d there is mounted a pin 88, which at its outer end carries a ticket pawl 92, the latter engaging with the ticket ratchet gear 82. This ticket pawl 92 is positioned in alignment with the ticket ratchet gear 82 by a spacer sleeve 90, which surrounds the pin 88 and abuts the ticket cam 85. A spring 91 is provided for biasing the ticket pawl 92 into engagement with the ticket ratchet gear 82, this spring being mounted at one end in a suitable hole in the spacer sleeve 90, and at its other end bearing on the pawl.

A rack driven gear 93 is likewise freely mounted on its ticket sprocket shaft 54 and has an inner hub 93a, which is secured to the ticket gear cam 85 in any suitable manner. The ticket cam 85 is maintained in alignment with the stop arm 75g of the timer cam follower and the rack gear 95 in alignment with a reciprocable rack 95 by a spacer collar 94, which freely surrounds the ticket sprocket shaft 54 and is positioned between the opposite face of the rack gear 93 and the rear plate 42 of the ticket issuing device. The ticket gear rack 95 engages and drives the ticket gear 93 and is slidably mounted in a guide comprised by a U shaped channel member 96, which is secured in any suitable manner to the inner face of the adjacent side plate 39, and the rack extends outwardly through a suitable hole 40 in the side plate. At its outer end the ticket gear rack 95 carries an operating knob 100. A coiled compression spring 98 surrounds the ticket gear rack 95 and at one end abuts a washer 97 positioned against the outer face of the side plate 39, and at the other end a similar washer positioned on the inner face of the knob 100. This spring 98 serves to bias the ticket gear rack 95 to its normal position and the ticket severing knife 105 also to its operative position.

Adjacent its inner end the ticket gear rack 95 is formed with a right angle arm 95a, which is reciprocable with the ticket gear rack in a vertical plane. At its lower end the fore arm 95a has secured thereto by screws 103 a right angle arm 104, which is reciprocable in a horizontal plane immediately above the intermediate horizontal plate 32. The arm 104 carries the ticket severing knife 105, which is secured to same by screws 106 (FIG. 7). Tickets are severed from the strip, which is trained downwardly from the ticket sprocket 80, by the knife 105 on the back stroke of the rack 95, the knife being carried along with the latter.

In the corner between the intermediate horizontal plate 32 and on one side plate 30 there is mounted a guide block 107. This block has its forward face suitably curved at 107a to provide clearance for the ticket sprocket 80 and the strip of tickets trained thereover. A ticket guide slot 108 extends through the guide block 107 in a general vertical direction and approximately parallel to the curved forward face 107a. The lower end of the slot 108 is aligned with the aperture 33 in the intermediate horizontal plate 32. A horizontal slot 109 extends from the curved forward face 107a of the guide block part way through the block and is positioned at approximately right angles to the slot 108. The slot 109 forms a guide for the knife 105. The tickets leaving the ticket sprocket 80 and entering the slot 108 in the guide block 107 are severed from the strip by the knife 105 and fall through the aperture 33 in the intermediate horizontal plate 32 into the ticket delivery compartment 47.

A second resetting means for the timer ratchet pawl release lever 65 is provided and is comprised in part by an L-shaped bar 110. This bar 110 has one arm 110a secured to the lower end of the fore arm 95a of the ticket gear rack 95 by the screws 103 and is reciprocable with the latter in a horizontal plane immediately above the intermediate horizontal plate 32. At the outer end of the other arm 110b there is mounted a short flexible rod 111, which passes through the lower rectangular aperture 27 in the front plate 21 and is positioned in the path of movement of the left pin 71 (FIG. 4) on the lower end of the vertical arm 65b of the timer ratchet pawl release lever 65.

It will be apparent that, as the ticket gear rack 95 is moved inwardly, the ticket knife 105 will be withdrawn from the slot 109 in the guide block 107 at the same time that the ticket sprocket 80 is rotated in the counter-clockwise direction (FIG. 3), in a manner to be later described, and the ticket strip leaving the sprocket will be fed downwardly through the slot 108 in the guide block 107. As the ticket gear rack 95 is moved back to the rest position under the action of the spring 98, the ticket knife 105 will enter the horizontal slot 109 in the guide block 107 and sever the ticket from the strip. The severed ticket will fall through the aperture 33 in the intermediate horizontal plate 32 and into the ticket delivery compartment 47 from which it may be removed by the person operating the parking meter.

In the operation of the device as a whole, the person paying for parking an automobile inserts a coin, a nickel or a dime, in the parking meter and turns the knob 16 in the clockwise direction, as viewed from the front of FIG. 2. As the timing shaft 15 of the clock works mechanism is rotated to wind up the main spring (not shown) the timer ratchet gear 52 is also rotated in the clockwise direction in ratio to the parking time paid for (five cents or ten cents, etc.) The timer ratchet pawl 60 is carried along with the timer ratchet gear 52 and rotates the timer cam 55 through the same angle as the timer ratchet gear 52. The timer cam follower 75 is swung outwardly in steps against the tension of the spring 73, due to the lobes 55c and 55d on the timer cam 55 successively contacting the right follower arm 75c and depressing same in the clockwise direction, as viewed in FIG. 4. At the same time the left stop arm 75g on the timer cam follower 75 is swung out of engagement with the lobe 85b on the ticket cam 80. The extent of the swinging movement of the timer cam follower 75 is dependent upon the degree of rotation of the timing shaft 15 of the clock works mechanism. For 90° rotation of the timing shaft 15, which corresponds to the insertion of a nickel in the parking meter, the lower bar 75d of the cam follower 75 will be moved outwardly due to the lobe 55c on the timer cam swinging the follower arm 75c, the extent of the chordal movement of the latter being, for example, one-quarter inch (¼"); this will place the left stop arm 75g on the timer cam follower 75 in the path of movement of the lobe 85c on the ticket cam 85, freeing the latter for 90° rotation.

The knob 100 on the ticket gear rack 95 may now be pushed and the ticket gear 95 will rotate ticket cam 85 until the lobe 85c on the latter abuts the stop arm 75g on the ticket cam follower 75. The ticket cam 85 will carry the ticket sprocket 80 through the same angle of rotation in the counter-clockwise direction, as viewed in FIG. 3, by the engagement of the ticket pawl 92 with the ticket gear 82. As the ticket gear rack 95 is moved inwardly the knife 105 clears the vertical slot 108 in the guide block 107, and the rotation of the ticket sprocket 80 will feed the ticket strip through the slot 108. On the return stroke of the ticket rack 95 through the action of the compression spring 28, the knife 105 is carried along with the ticket gear rack 95 to the left, also as viewed in FIG. 3, traveling through the horizontal slot 109 in the guide block 107 and severing a ticket from the strip. The severed ticket falls through the aperture 33 in the intermediate horizontal plate 32 and into the ticket delivery compartment 47. Also, on the return stroke of the ticket gear rack 95, the ticket cam 85 is returned to its normal or rest position with the lug 85 abutting the stop sleeve 86. Upon the return of the ticket cam 85 to its rest position, the timer cam follower 75 will be swung in the clockwise direction, as viewed in FIG. 3, by the coiled spring 73. The left stop arm 75g of the timer cam follower will then drop in front of the lobe 85b on the ticket cam 85. This will make it impossible for the person operating the ticket dispensing device to secure another ticket by again pushing the ticket gear rack inwardly.

The operation is quite similar for the insertion of a dime into the parking meter. For rotation of 180° in the clockwise direction, as viewed from the front in FIG. 2, of the knob 16 and the timing shaft 15, which corresponds to the insertion of a dime, the lower bar 75d of the timer cam follower 75 will be moved outwardly to a greater extent due to the lobe 55d on the timer cam 55 swinging the follower arm 75c through the larger arc, the extent of the chordal movement in this case being, for example, one-half inch (½"); this will swing the left stop arm 75g on the timer cam follower out of engagement with the lobe 85b and out of the path of travel of the lobe 85c, but leave same in the path of travel of the radially positioned lug 85d on the ticket cam 85. When the ticket gear rack 95 is now pushed inwardly, the ticket cam 85 will be rotated through 180°, until the radially positioned lug 85d abuts the left stop arm 75g on the timer cam follower, and the ticket sprocket 80 will be partially rotated through the same angle to feed a double ticket through the vertical slot 108 in the guide block 107. This double ticket will be severed on the return stroke of the ticket gear rack 95, as before, and will fall through the aperture 33 in the intermediate plate 32 into the ticket delivery compartment 47.

The first resetting mechanism for the timer ratchet pawl release lever 65 operates when the person parking the automobile does not accept a ticket, as will be explained later; the second resetting mechanism operates when the person parking the automobile does accept a ticket. This latter mechanism operates in the following manner: As the ticket gear rack 95 is pushed inwardly to deliver a ticket, the forearm 95a moves towards the right, as viewed in FIG. 5, the L-shaped bar 110 toward the right, as viewed in FIG. 7, and the flexible rod 111 toward the right, as viewed in FIGS. 4 and 4-A. For the insertion of a dime in the parking meter and 180° rotation of the ticket gear 93, the flexible rod 111 will move from the full line position shown at B to the dotted line position shown at B₁, in FIG. 4–A; for the insertion of a nickel, and 90° rotation of the ticket gear 93, it will move to a position intermediate the full line position and the dotted line position. While so moving to the left, as viewed in FIG. 4–A, the flexible rod 111 will pass over the left pins 71 on the lower end of the timer ratchet pawl release lever 65, but will not swing the lever. Upon the return movement of the rack 95 under the action of the spring 98, however, the flexible rod 111 will return from the dotted line position to the full line position. In passing over the left pin 71 it will swing the timer ratchet pawl release lever 68 about its pivot 66 in the counter-clockwise direction, as viewed in FIG. 4. The U shaped cam extension 65d on the lever will lift the timer pawl 60 out of engagement with the timer ratchet gear 52 and the coiled tension spring 63 will rotate the timer cam 55 in the reverse direction to its rest position against the stop block 61, the timer pawl 60 passing freely over the timer ratchet gear 52.

In case the person parking the automobile does not accept a ticket, the knob 100 will not be pushed and the ticket sprocket 80 will not be rotated. Consequently the ticket strip will not be advanced through the vertical slot 108 in the guide block 107. The ticket is, however, still available to the person parking the automobile, if the knob 100 should be pushed. This situation prevails until the clock works mechanism (not shown) starts to run down. As the clock works mechanism runs down, the stub shaft 50 is rotated in the clockwise direction, as viewed from the front in FIG. 2. The timer ratchet gear 52 rotates with the stub shaft 50 and the timer ratchet pawl 60 carries the timer cam 55 along with same. After a predetermined degree of rotation, the follower arm 75c of the timer cam follower 75 drops off the lobe 55d of the timer cam. This coiled tension spring 73 now swings the timer cam follower 75 in the counter-clockwise direction, as viewed in FIG. 4, and the stop arm 75g is brought in front of the lobe 85b on the ticket cam 85. This locks the ticket cam 85 against rotation and no ticket will now be issued, if the knob 100 should be pushed.

When the ticket delivery mechanism is locked against the delayed issuance of a ticket as above described, the first resetting mechanism operates to reset the timer ratchet pawl release lever 65. Upon the insertion of a nickel in the parking meter and the swinging of the lower rod 75d of the timer cam follower 75 in the clockwise direction, as viewed in FIG. 4, through a chordal distance of one-quarter inch (¼"), in the manner above described, the flexible rod 72 moves from its normal or rest position, as shown in full lines at A in FIG. 4–A, to the position between the pins 71—71, as shown in dotted lines at A; similarly, upon the insertion of a dime in the parking meter and the swinging of the lower rod 75d of the timer cam follower in the clockwise direction through a chordal distance of one-half inch (½"), also in the manner above described, the flexible rod moves from the normal or rest position at A to the second position, as shown in dotted lines at $A_2$. While thus moving to the left, as viewed in FIG. 4–A, and passing over either the right pin 71, or both pins 71—71, at the lower end of the timer ratchet pawl release lever 65, the flexible rod will not swing the lever about its pivot 66. The return movement of the flexible rod 72 takes place when the follower arm 75c drops off the lobe 55d on the timer cam 55, and the timer cam follower is swung in the counter-clockwise direction, as viewed in FIG. 4, by the coiled tension spring 73. In moving from the dotted line position shown at $A_1$ to the full line position shown at A, the flexible rod 72 will strike the right pin 71 and swing the timer ratchet pawl release lever 65 about its pivot 66 in the counter-clockwise direction, as viewed in FIG. 4; similarly, in moving from the dotted line position shown at $A_2$ to the full line position shown at A, the flexible rod 72 will strike the left pin 71 and swing the timer ratchet pawl release lever 65 about its pivot 66 in the counter-clockwise direction. In either case, the U-shaped cam extension 65d on the lever will lift the timer pawl 60 out of engagement with the timer ratchet gear 52 and the coiled tension spring 63 will rotate the timer cam 55 in the reverse direction to its rest position against the stop blocks 61, with the timer pawl 60 passing freely over the timer ratchet gear 52, as is the case with the second resetting mechanism described above. While the flexible rod 72, in moving from the dotted line position shown at $A_2$ to the full line normal or rest position shown at A in FIG. 4, will also strike the right pin 71, this will have no effect as the action of the flexible rod 72 in previously striking the left pin 71 will have partially rotated the timer ratchet pawl release lever 65 to reset the mechanism.

Having now fully described my invention what I claim as new and useful and desire to secure by Letters Patent of the United States is:

1. A ticket issuing device for use with a parking meter having a clock works including a timing shaft rotatable through a number of different degrees according to the denomination of the coin inserted in the parking meter, a spindle for rotatably supporting a roll of tickets, a rotatably mounted ticket sprocket over which a strip of tickets from said roll is trained, means for rotating said ticket sprocket to deliver tickets therefrom, and mechanism interconnecting the timing shaft of the clock works and the means for rotating said ticket sprocket for limiting the extent of operation of said means according to the degree of rotation of said timing shaft in one direction.

2. A ticket issuing device for use with a parking meter having a clock works including a timing shaft rotatable through two different degrees according to the denomination of the coin inserted in the parking meter, a spindle for rotatably supporting a roll of tickets, a rotatably mounted ticket sprocket over which a strip of tickets from said roll is trained, means for rotating said ticket sprocket to deliver tickets therefrom, and mechanism interconnecting the timing shaft of the clock works and the means for rotating said ticket sprocket for limiting the operation of said means in two different extents according to the degree of rotation of said timing shaft in one direction.

3. A ticket issuing device for use with a parking meter having a clock works including a timing shaft, a spindle for rotatably supporting a roll of tickets, a rotatably mounted ticket sprocket over which a strip of tickets from said roll is trained, a timer cam, a timer ratchet gear mounted on said timing shaft, a pawl carried by said timer cam engageable with the timer ratchet gear for rotating the latter cam in accordance with the rotation of the timing shaft in one direction, means including a ticket ratchet gear connected to said ticket sprocket, a ticket cam, a pawl carried by said ticket cam engageable with the ticket ratchet gear for rotating said ticket sprocket to deliver tickets therefrom, and a timer cam follower engageable by said timer cam and engageable with ticket cam for limiting the degree of rotation of the ticket cam and ticket sprocket according to the degree of rotation of said timing shaft in one direction.

4. A ticket issuing device for use with a parking meter having a clock works including a timing shaft rotatable through two different degrees according to the denomination of the coin inserted in the parking meter, a spindle for rotatably supporting a roll of tickets, a rotatably mounted ticket sprocket over which a strip of tickets from said roll is trained, means including a ratchet gear connected with said ticket sprocket, a ticket cam having arcuately spaced cam lobes thereon, a pawl carried by said ticket cam engageable with said ratchet gear for rotating said ticket sprocket to deliver tickets therefrom, and a timer cam follower engageable by said timer cam and engageable with said ticket cam for limiting the rotation of said ticket sprocket in two different degrees according to the degree of rotation of said timing shaft in one direction.

5. A ticket issuing device for use with a parking meter having a clock works including a timing shaft, a spindle for rotatably supporting a roll of tickets, a rotatably mounted ticket sprocket over which a strip of tickets from said roll is trained, a timer cam, a timer ratchet gear mounted on said timing shaft, a pawl carried by said timer cam engageable with the timer ratchet gear for rotating the latter in accordance with the rotation of the timing shaft in one direction, means including a ticket ratchet gear connected to said ticket sprocket, a ticket cam, a pawl carried by said ticket cam engageable with the ticket ratchet gear for rotating said ticket sprocket to deliver tickets therefrom, a timer cam follower engageable by said timer cam and engageable with said ticket cam for limiting the degree of rotation of the ticket cam and ticket sprocket according to the degree of rotation of said timing shaft in one direction, and a reset lever engageable with said timer pawl and connected in said timer cam follower for disengaging the pawl from the timer ratchet gear in response to a predetermined degree of rotation of the timer cam.

6. A ticket issuing device for use with a parking meter having a clock works including a timing shaft rotatable through two different degrees according to the denomination of the coin inserted in the parking meter, a spindle for rotatably supporting a roll of tickets, a rotatably mounted ticket sprocket over which a strip of tickets from said roll is trained, means for rotating said ticket sprocket to deliver tickets therefrom including a gear connected to same, a rack in engagement with said gear for operating the latter, and mechanism interconnecting the timing shaft of the clock works and the gear connected to said ticket sprocket for limiting the degree of rotation of said latter gear in two different extents according to the degree of rotation of said timing shaft in one direction.

7. A ticket issuing device for use with a parking meter having a clock works including a timing shaft, a spindle for rotatably supporting a roll of tickets, a rotatably mounted ticket sprocket over which a strip of tickets from said roll is trained, a timer cam, a timer ratchet gear mounted on said timing shaft, a pawl carried by said timer cam engageable with the timer ratchet for rotating the latter in accordance with the rotation of the timing shaft in one direction, means including a ticket ratchet gear connected to said sprocket, a ticket cam, a driving gear connected to said ticket cam, a pawl carried by said ticket cam engageable with the ticket ratchet gear, a rack in engagement with said driving gear for rotating said ticket sprocket to deliver tickets therefrom, a timer cam follower engageable by said timer cam and engageable with said ticket cam for limiting the degree of rotation of the ticket cam and ticket sprocket according to the degree of rotation of said timing shaft in one direction, and a reset lever engageable with said timer pawl and connected to said timer cam follower for disengaging the pawl from the timer ratchet gear in response to a predetermined degree of rotation of said timer cam.

8. A ticket issuing device for use with parking meters including a timing shaft, a timing cam having at least two lobes thereon rotatable with the timing shaft, a ticket issuing mechanism including a sprocket over which a strip of tickets is trained, a ticket cam having at least two lobes thereon rotatable with said sprocket, and means interconnecting the timing cam and ticket cam for normally locking the ticket cam and limiting the rotation of the latter to two intervals corresponding to the angle of rotation of the timing cam.

9. A ticket issuing device for use with parking meters having a clock works mechanism including a timing shaft, a spindle for rotatably supporting a roll of tickets, a rotatably mounted sprocket over which a strip of tickets from said roll is trained, a timer cam, a spring connected to said timer cam for biasing same to rest position, a timer ratchet gear mounted on said timing shaft, a pawl carried by said timer cam engageable with the timer ratchet gear for rotating the latter cam in accordance with the rotation of the timer ratchet gear in one direction, a reset lever engageable with said pawl for releasing same from engagement with the timer ratchet gear, mechanism for rotating the ticket sprocket to deliver tickets therefrom including a ticket cam drivably connected to same, a timer cam follower engageable by said timer cam and engageable with said ticket cam for determining the rotation of the ticket cam in accordance with the rotation of the timer cam, and a member carried by said timer cam follower engageable with said reset lever upon predetermined movement of the timer cam follower.

10. A ticket issuing device for use with parking meters having a clock works mechanism including a timing shaft, a spindle for rotatably supporting a roll of tickets, a rotatably mounted sprocket over which a strip of tickets from said roll is trained, a timer cam, a spring connected to said timer cam for biasing same to rest position, a timer ratchet gear mounted on said timing shaft, a pawl carried by said timer cam engageable with the timer ratchet gear for rotating the latter cam in accordance with the rotation of the timer ratchet gear in one direction, a reset lever engageable with said pawl for releasing same from engagement with the timer ratchet gear, mechanism for rotating the ticket sprocket to deliver tickets therefrom including a ticket cam, a rack driven gear drivably connected thereto, a rack engageable with the rack driven gear, a member carried by said rack engaged with said reset lever upon predetermined movement of the rack, and a timer cam follower engageable by said timer cam and engageable with said ticket cam for determining the rotation of the ticket cam in accordance with the rotation of the ticket cam.

11. A ticket issuing device for use with parking meters having a clock works mechanism including a timing shaft, a spindle for rotatably supporting a roll of tickets, a rotatably mounted sprocket over which a strip of tickets from said roll is trained, a timer cam, a spring connected to said timer cam for biasing same to rest position, a timer ratchet gear mounted on said timing shaft, a pawl carried by said timer cam engageable with the timer ratchet gear for rotating the latter cam in accordance with the rotation of the timer ratchet gear in one direction, a reset lever engageable with said pawl for releasing same from engagement with the timer ratchet gear, mechanism for rotating the ticket sprocket deliver tickets therefrom including a ticket cam and a rack driven ticket gear drivably connected thereto, a timer cam follower engageable by said timer cam and engageable with said ticket cam for determining the rotation of the ticket cam in accordance with the rotation of the timer cam, a member carried by said timer cam follower engageable with said reset lever upon predetermined movement of the timer cam follower, a rack engageable with the ticket gear, and a member carried by said rack engageable with said reset lever upon predetermined movement of the rack.

References Cited in the file of this patent

UNITED STATES PATENTS 2,103,720   Helsel _____ Dec. 28, 1937

FOREIGN PATENTS 811,497   Great Britain _____ Apr. 8, 1959